(12) United States Patent
Cacioppo et al.

(10) Patent No.: US 8,450,972 B2
(45) Date of Patent: May 28, 2013

(54) RECHARGEABLE ERASER AND CHARGING TRAY

(75) Inventors: Christopher M. Cacioppo, Somerville, MA (US); Hector Padilla, Chelsea, MA (US)

(73) Assignee: Sanford L.P., Oak Brook, IL (US)

( * ) Notice: Subject to any disclaimer, the term of this patent is extended or adjusted under 35 U.S.C. 154(b) by 577 days.

(21) Appl. No.: 12/648,845

(22) Filed: Dec. 29, 2009

(65) Prior Publication Data

US 2010/0164434 A1 Jul. 1, 2010

Related U.S. Application Data

(60) Provisional application No. 61/141,530, filed on Dec. 30, 2008.

(51) Int. Cl.
*H02J 7/00* (2006.01)
(52) U.S. Cl.
USPC .......................................... 320/115; 320/107
(58) Field of Classification Search
USPC ......................................................... 320/115
See application file for complete search history.

(56) References Cited

U.S. PATENT DOCUMENTS

| | | | |
|---|---|---|---|
| 3,143,697 A | 8/1964 | Springer | |
| 3,521,050 A | 7/1970 | Shagena, Jr. | |
| 4,695,680 A * | 9/1987 | Kable | 178/19.01 |
| D299,318 S | 1/1989 | Chiang | |
| 5,446,633 A * | 8/1995 | Hanggi | 362/118 |
| 5,529,501 A | 6/1996 | Maruyama | |
| D413,871 S | 9/1999 | McCormick | |
| 5,973,677 A * | 10/1999 | Gibbons | 345/179 |
| 6,188,392 B1 | 2/2001 | O'Connor et al. | |
| D441,267 S | 5/2001 | Heun | |
| 6,232,962 B1 | 5/2001 | Davis et al. | |
| D443,303 S | 6/2001 | Ashe | |
| 6,257,789 B1 | 7/2001 | Podszuweit et al. | |
| 6,262,684 B1 | 7/2001 | Stewart et al. | |
| 6,377,054 B1 | 4/2002 | Beha | |
| D464,653 S | 10/2002 | Nagai et al. | |
| 6,529,920 B1 | 3/2003 | Arons et al. | |
| 6,621,697 B2 | 9/2003 | O'Hara et al. | |
| 6,729,543 B1 | 5/2004 | Arons et al. | |
| 6,806,868 B2 | 10/2004 | Chuang | |
| D500,799 S | 1/2005 | Olson | |
| D508,077 S | 8/2005 | Bhavnani | |
| D508,528 S | 8/2005 | Shimizu | |
| 6,966,495 B2 | 11/2005 | Lynggaard et al. | |
| 7,086,907 B2 | 8/2006 | Bhavnani | |
| 7,109,979 B2 | 9/2006 | Moyne et al. | |
| 7,143,134 B2 | 11/2006 | Petrie et al. | |
| 7,180,509 B2 | 2/2007 | Fermgard et al. | |
| 7,239,306 B2 | 7/2007 | Fahraeus et al. | |
| 7,249,716 B2 | 7/2007 | Bryborn | |
| D569,205 S | 5/2008 | Lai | |
| D593,387 S | 6/2009 | Liao | |
| D595,718 S | 7/2009 | Richter et al. | |
| 2005/0219225 A1 * | 10/2005 | Dunn et al. | 345/173 |
| 2006/0036051 A1 * | 2/2006 | Xu et al. | 526/279 |
| 2006/0220617 A1 | 10/2006 | Yuen | |
| 2006/0232239 A1 | 10/2006 | Maglica et al. | |
| 2009/0160825 A1 | 6/2009 | Payne | |

FOREIGN PATENT DOCUMENTS

| | | |
|---|---|---|
| EP | 0 344 897 A2 | 12/1989 |
| WO | WO-93/20536 A1 | 10/1993 |
| WO | WO-2010/078338 A1 | 7/2010 |

OTHER PUBLICATIONS

Office for Harmonization in the Internal Market, RCD-Online—Design consultation service—RCD information, available at http://oami.europa.eu/RCDOnline/RequestManager (1 of 3) on Oct. 11, 2009.
Photograph (2503) of Livescribe charger, understood to be on sale before Dec. 30, 2007.
Photograph (2504) of Livescribe pen and charger, understood to be on sale before Dec. 30, 2007.
Photograph (2505) of Livescribe charger, understood to be on sale before Dec. 30, 2007.
Photograph (2506) of Livescribe pen and charger, understood to be on sale before Dec. 30, 2007.
Photograph (2507) of Livescribe charger, understood to be on sale before Dec. 30, 2007.
Photograph (2508) of Livescribe pen and charger, understood to be on sale before Dec. 30, 2007.
International Search Report for PCT/US2009/069701, mailed May 5, 2010 (4 pages).
Written Opinion for PCT/US2009/069701, mailed May 5, 2010 (7 pages).

* cited by examiner

*Primary Examiner* — Arun Williams
(74) *Attorney, Agent, or Firm* — Marshall, Gerstein & Borun LLP

(57) ABSTRACT

A system for recording writing performed on a surface includes a rechargeable stylus, a rechargeable eraser, and a charging station for one or both of the rechargeable stylus and the rechargeable eraser. Each of the rechargeable stylus and the rechargeable eraser includes a pair of charging rings. The charging rings are disposed so as to contact a corresponding pair of charging contacts on a receptacle on the charging station for the stylus or the eraser. The receptacle, charging contacts, and charging rings cooperate to charge rechargeable stylus or the rechargeable eraser when the stylus or eraser is placed into the receptacle.

20 Claims, 12 Drawing Sheets

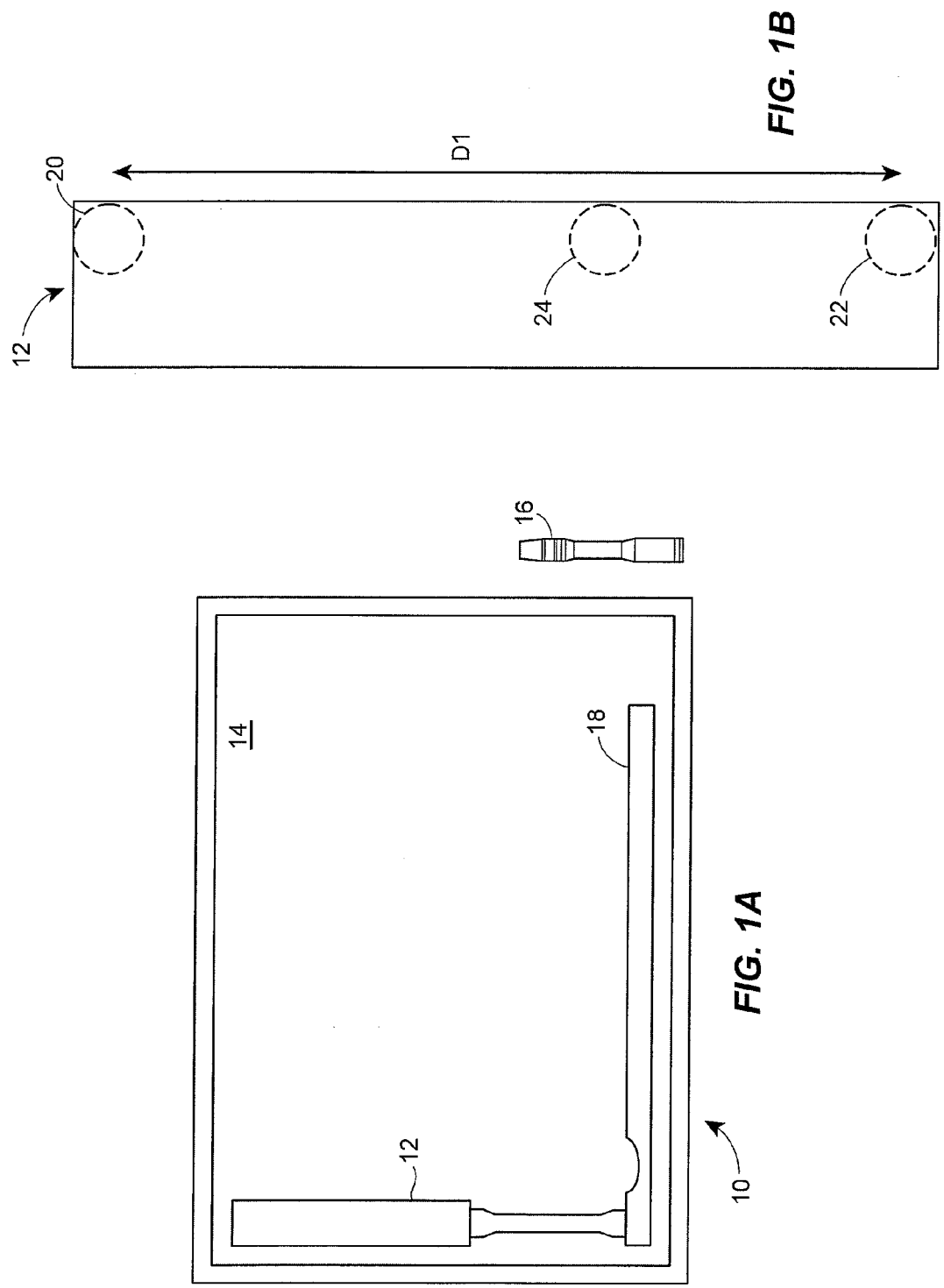

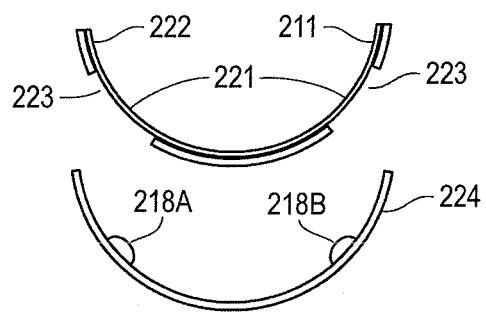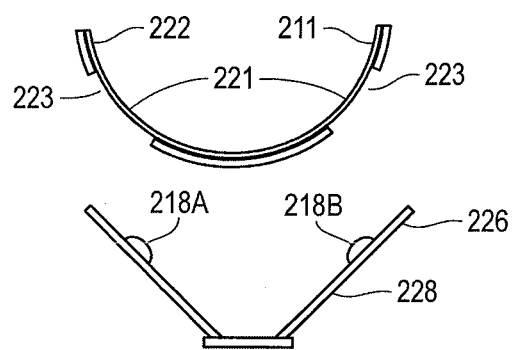
FIG. 8A　　　　　　　　　FIG. 8B

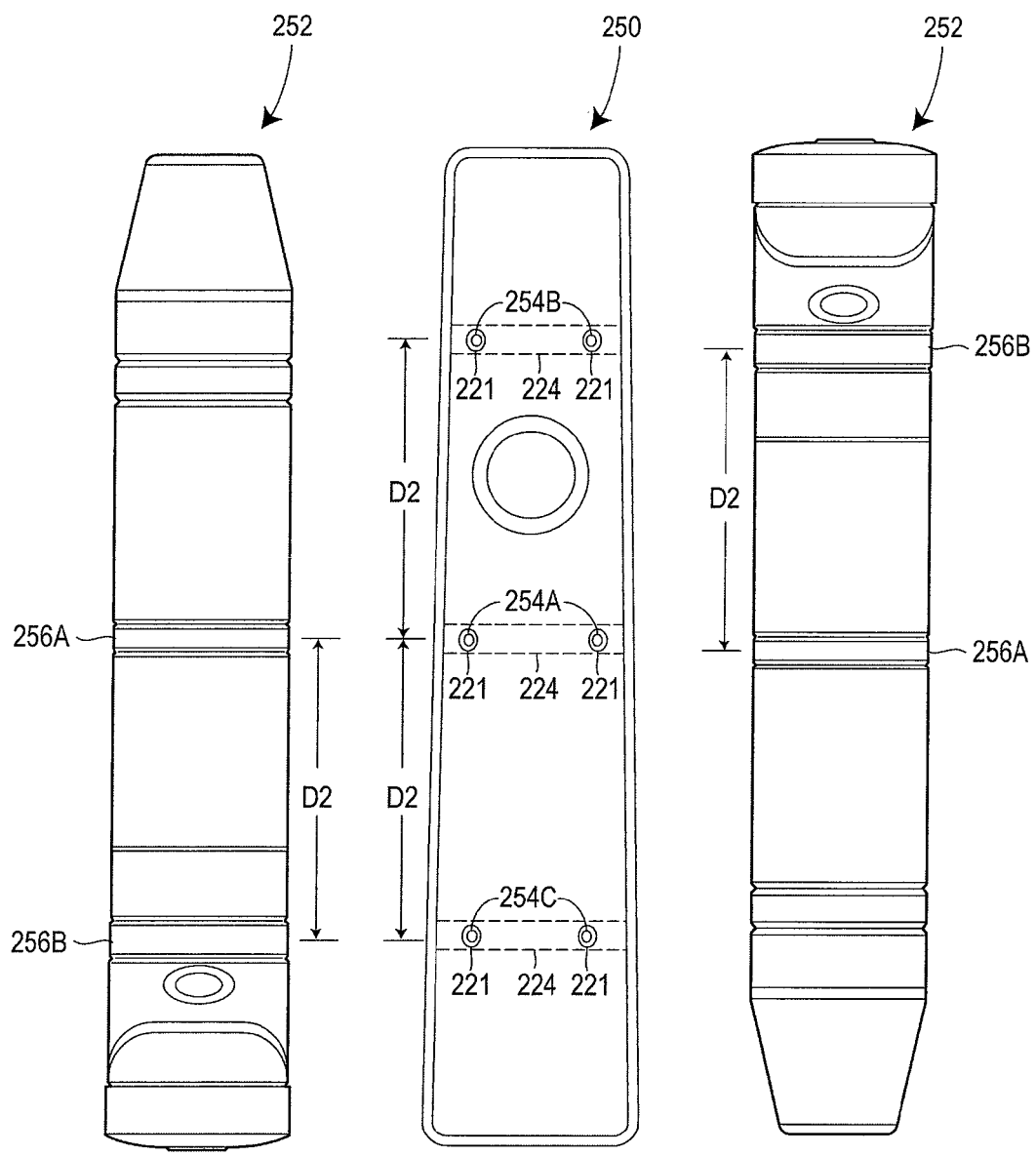
*FIG. 10A*  *FIG. 10B*  *FIG. 10C*

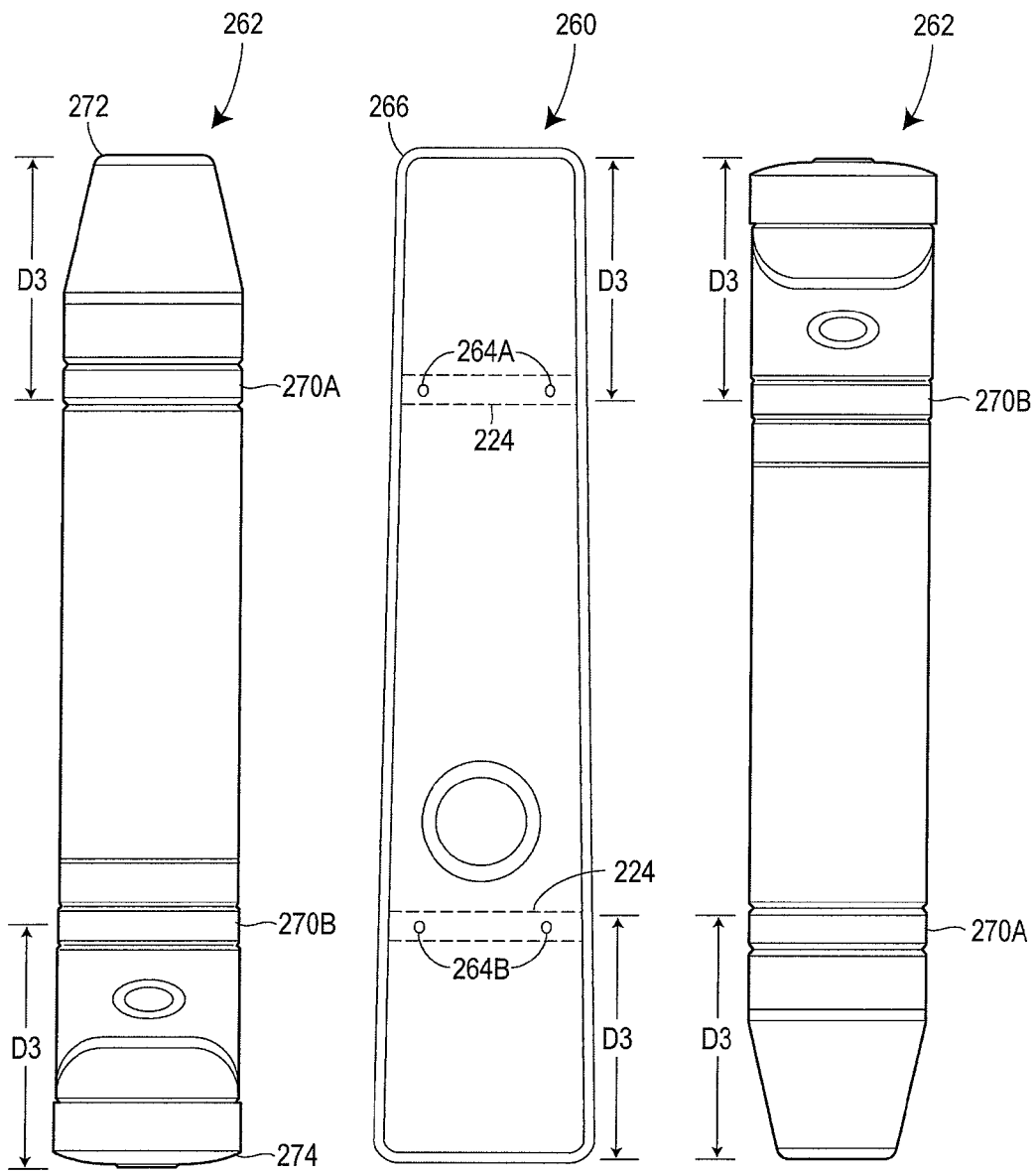
FIG. 11A   FIG. 11B   FIG. 11C

RECHARGEABLE ERASER AND CHARGING TRAY

RELATED APPLICATIONS

This application claims priority under 35 U.S.C. §119(e) to U.S. Provisional Application No. 61/141,530, filed on Dec. 30, 2008, the entirety of which is hereby incorporated herein by reference.

TECHNICAL FIELD

The present disclosure relates generally to a system for recording writing performed on a surface. More particularly, the disclosure is directed to a rechargeable stylus for a system for recording writing performed on a surface, a rechargeable eraser for a system for recording writing performed on a surface, and a charging station for the rechargeable stylus and/or the rechargeable eraser.

BACKGROUND

Technologies for capturing and storing handwritten notes include digitized writing surfaces such as electronic whiteboards and spatial recognition pens. Typically, electronic whiteboards either photocopy the entire writing surface or serve as the actual input device, recording the movements of a pen or stylus along the surface of the board. Spatial recognition pens record the movement of the pen across a writing surface, which surface typically must include special marking for the pen to recognize its position. Newer systems track the movement of a stylus across any surface using technology embedded in the stylus. One such system, which uses ultrasonic position tracking, is described in U.S. Pat. No. 7,109,979, entitled "System and Method for Recording Writing Performed on a Surface," and is hereby incorporated herein by reference. Typically, styli used in such systems, such as that described in U.S. Pat. No. 6,111,565, entitled "Stylus for Use with Transcription System," and hereby incorporated herein by reference, include a transmitter (e.g., an ultrasonic transmitter), which must be supplied with a power source. Additional features of similar systems are described in U.S. Pat. Nos. 6,100,877, 6,104,387, 6,124,847, 6,147,681, 6,177,927, 6,191,778, 6,211,863, 6,217,686, 6,232,962, 6,292,180, 6,310,615, and 7,109,979, each of which is hereby incorporated herein by reference.

BRIEF DESCRIPTION OF THE DRAWINGS

FIG. 1A depicts an exemplary rechargeable stylus system that may be used with a system for capturing and digitizing markings on a writing surface;

FIG. 1B depicts a more detailed view of a portion of the system of FIG. 1A;

FIG. 8A depicts an alternate embodiment of a charging contact for use in the charging tray of FIG. 5;

FIG. 8B depicts a different alternate embodiment of a charging contact for use in the charging tray of FIG. 5;

FIG. 10A illustrates a second embodiment of a rechargeable stylus for use in the system of FIG. 1;

FIG. 10B illustrates an embodiment of a charging tray receptacle for use with the rechargeable stylus of FIG. 10A;

FIG. 10C depicts the rechargeable stylus of FIG. 10A in a different orientation to illustrate compatibility with the charging tray receptacle of FIG. 10B;

FIG. 11A illustrates a third embodiment of a rechargeable stylus for use in the system of FIG. 1;

FIG. 11B illustrates an embodiment of a charging tray receptacle for use with the rechargeable stylus of FIG. 11A;

FIG. 11C depicts the rechargeable stylus of FIG. 11A in a different orientation to illustrate compatibility with the charging tray receptacle of FIG. 11B.

DETAILED DESCRIPTION

Figure 1C:
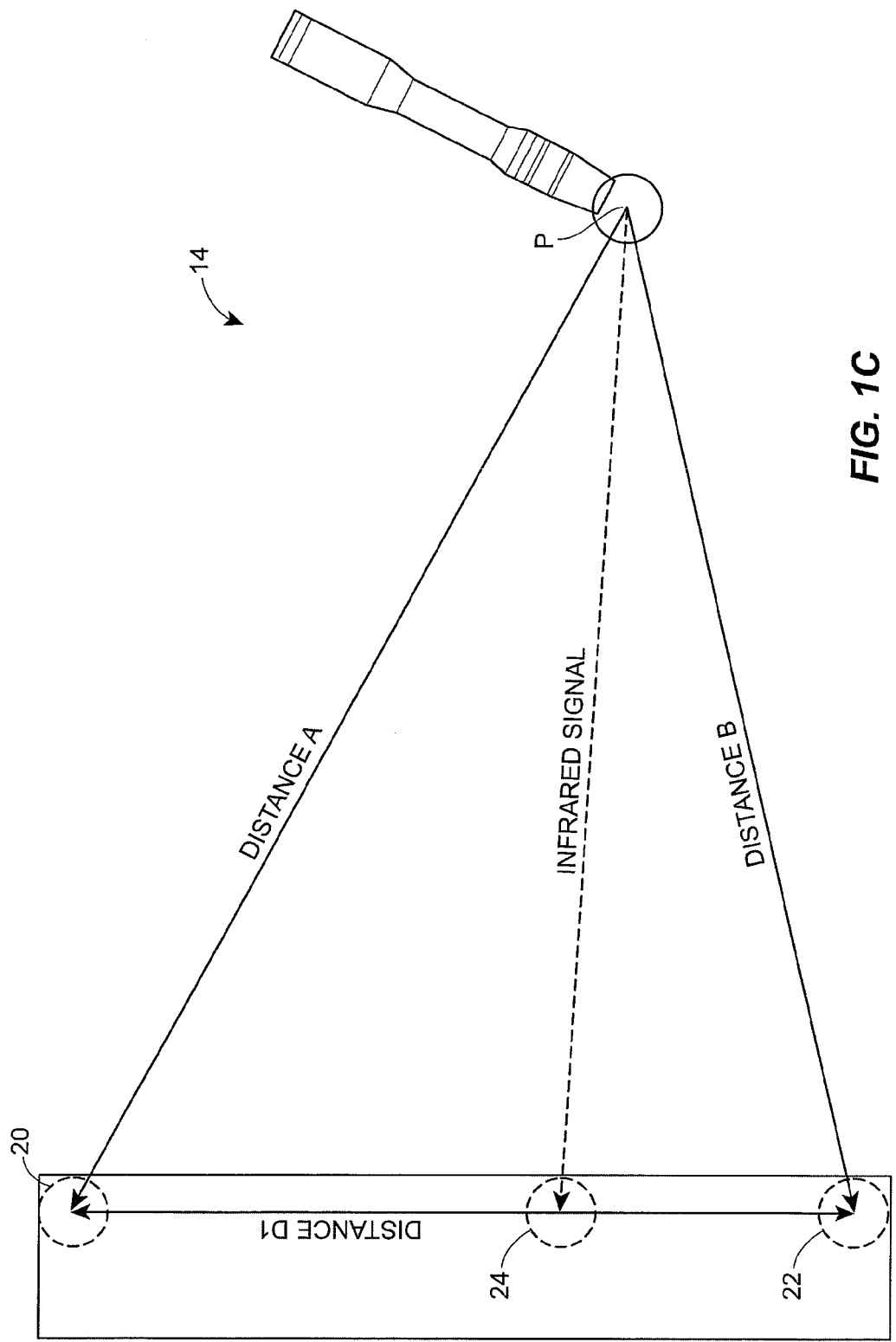
FIG. 1C illustrates the functionality of the portion of the system depicted in FIG. 1B.

The present disclosure relates to a digitizing system for recording movements of a stylus across a surface and, in particular, to a rechargeable stylus for use with the system and a charging station for the stylus. The digitizing system digitizes the movement of the stylus across the surface by tracking the stylus using signals such as infrared signals, ultrasonic signals, and the like. The movements of the stylus across the surface may include the formation or modification of any type of image by the stylus, including printing, drawings, sketching, erasing, etc. The surface across which the digitizing system tracks movement of the stylus may be any suitable surface including, but not limited to, dry erase boards, chalk boards, clipboards, desktops, walls, projection screens, flip chart tablets, and glass panels, regardless of whether any of these surfaces is covered by a material such as paper, glass, metal, or plastic, which can be written upon. The surface is preferably relatively smooth and relatively flat, though the surface may have a small degree of curvature.

FIG. 1A illustrates one use of a digitizing system 10. The digitizing system 10 includes a tracking and communication unit (TCU) 12, a writing surface 14, a stylus 16, and a stylus charging station 18. FIG. 1A depicts the writing surface 14 as a dry erase board (i.e., a "whiteboard") though, as noted above, the writing surface 14 may be any desired surface.

Although FIG. 1A illustrates the writing surface 14 as a vertical surface, it should be noted that the writing surface 14 could also be a horizontal surface, as the orientation of the surface is irrelevant to operation of the digitizing system 10. The digitizing system 10 tracks the movements of the stylus 16 across the writing surface 14. However, it is not necessary that the movement of the stylus 16 creates any mark on the writing surface 14 for the system 10 to operate to digitize the movements of the stylus 16. Moreover, while many of the embodiments described herein are described with reference to a dry erase board such as that depicted in FIG. 1A, and an accompanying dry erase stylus, the stylus 16 may be any desired stylus. For example, in some embodiments, the stylus 16 operates as a pointing device (e.g., a mouse) and not a marking device, and the system 10 digitizes the movement of the stylus 16 across a projector screen (not shown), which allows the system 10 to be used with a computer (not shown) and a projector (not shown).

In any event, the stylus 16 is preferably wireless, to facilitate easy movement of the stylus 16 across the writing surface 14. As described below, the digitizing system 10 processes signals received from the stylus 16 in order to track the movement of the stylus 16 across the writing surface 14. Of course, generation of the signals requires a transmitter and a power source for the transmitter. Thus, the stylus 16 also includes a battery and, in particular, a rechargeable battery. The system 10 includes the charging tray 18 for this purpose. The stylus 16 and the charging tray 18 are described in greater detail below.

Each of the TCU 12 and the charging tray 18 may be mounted to the writing surface 14, though the charging tray 18 may also be mounted to any convenient surface, as its presence is not strictly required for proper operation of the digitizing system 10. In one embodiment, the writing surface 14 is a magnetic surface, such as a dry erase board that includes a steel plate, and one or both of the TCU 12 and the charging station 18 are removably mounted to the writing surface 14 by an array of rare earth magnets (not shown). The rare earth magnets preferably exert a strong magnetic force over a short distance, providing sufficient force to hold the TCU 12 and/or the charging station 18 to the writing surface 14 (or other surface), but allowing relatively easy removal of the TCU 12 and/or the charging station 18 from the writing surface 14 (or other surface). Of course, the TCU 12 and/or the charging station 18 may be adhered to the writing surface 14 using any known method including, but not limited to, suction cups, hook-and-loop material, one or more individual magnets, adhesive tape, etc., depending on the writing surface 14, the permanence of the installation, cost, etc. For example, if the writing surface 14 is a glass window pane, suction cups may be preferable.

FIG. 1B illustrates in greater detail the TCU 12. In the illustrated embodiment, the TCU 12 is a mobile device that tracks the position and/or movement of the stylus 16 across the writing surface 14 using ultrasonic and infrared signals transmitted by the stylus 16, and also receives additional information about the stylus 16 in the infrared signal. The TCU 12 includes ultrasonic two sensors 20 and 22 separated by a fixed distance, D1, and an infrared sensor 24. When the stylus 16 is pressed against the writing surface 14, the stylus 16 emits both infrared and ultrasonic signals. The infrared sensor 24 receives the infrared signal, which identifies which stylus touched the surface (the system 10 may include numerous styli including, for example, different colors of writing styli, styli using different types of writing elements, styli with different width writing tips, a mouse stylus, etc.) using an encoded signal. The infrared signal received by the infrared sensor 24 also indicates to the TCU 12 that the stylus 16 transmitted an ultrasonic signal. Meanwhile, the ultrasonic sensors 20 and 22 receive the ultrasonic signal transmitted by the stylus 16.

FIG. 1C illustrates the concept behind the method used by the TCU 12 to track the stylus 16. FIG. 1C depicts the stylus 16 at a position, P, on the writing surface 14. As described above, upon being pressed against the writing surface 14, the stylus 16 transmits both an infrared signal and an ultrasonic signal. The infrared signal arrives at the infrared sensor 24 before the ultrasonic signals arrive at the ultrasonic sensors 20 and 22 because, of course, light travels faster than sound. The infrared signal, in addition to indicating to the TCU 12 which stylus is in contact with the writing surface 14, also activates the ultrasonic sensors 20 and 22. The TCU 12 uses the known time at which the stylus 16 transmitted the ultrasonic signals (i.e., the time at which the infrared sensor 24 received the infrared signal) and the time at which each of the ultrasonic sensors 20 and 22 received the ultrasonic signal to calculate the distance between the stylus 16 and the ultrasonic sensors 20 and 22. The TCU 12 employs a computer processor (not shown) to calculate the location of the stylus 16 using basic trigonometric formulas. That is, knowing that the stylus 16 is a distance A from the ultrasonic sensor 20 and a distance B from the ultrasonic sensor 22, and knowing that a distance, D1, separates the ultrasonic sensors 20 and 22, the TCU 12 can calculate the angles of the resulting triangle and, by doing so, the precise location of the stylus 16 on the writing surface 14.

Figure 2:
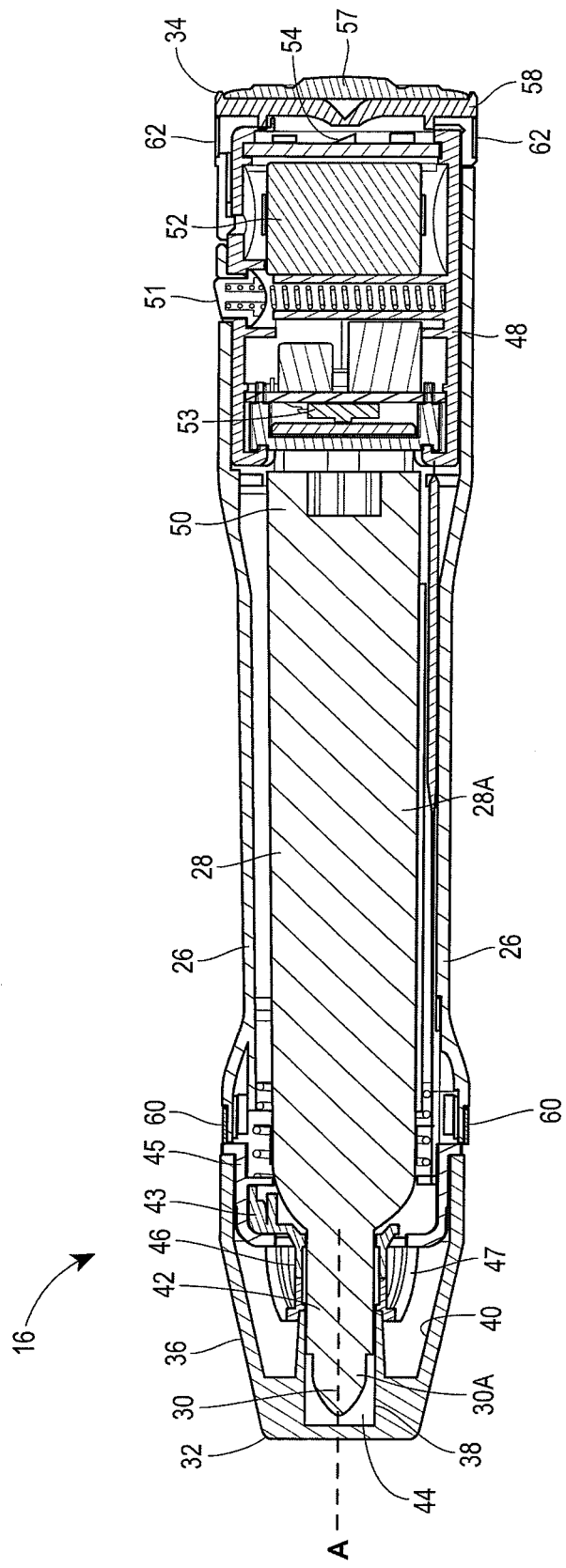
FIG. 2 is a cross-sectional view of a rechargeable stylus for use with an exemplary rechargeable stylus system.

One or more styi 16 may be used with the system 10. FIG. 2 illustrates a cross-sectional view of an embodiment of a stylus 16 that can be used with the system 10 illustrated in FIG. 1A. As illustrated, the stylus 16 includes a tip end 32 and a circuitry end 34. The stylus 16 includes a stylus housing 26 forming an elongated body, generally symmetrical about a lengthwise axis A, that may encompass a writing element 28. FIG. 2 depicts a dry erase marker, such as the SANFORD EXPO, as the writing element 28. However, the stylus 16 may employ any suitable writing element 28 including, by way of example and not limitation, an inkwell, chalk, a pencil, pencil lead, or a pen. The writing element 28 may have a writing tip 30, such as the tip 30 of the marker illustrated in FIG. 2. Alternatively, a non-writing element 28A may replace the writing element 28 when, for example, a user desires that the stylus 16 not create marks on the writing surface 14 (e.g., when the stylus is acting as an input device, such as a mouse or pointing device, to a computer projecting a display through a projector onto the writing surface 14, which writing surface 14 may be a projector screen). The non-writing element 28A may, for example, have an identical form factor to the writing element 28 (e.g., the dry erase marker), but may substitute for the writing tip 30 a non-marking tip 30A, such as a Teflon tip for moving along the writing surface 14. Of course, alternate writing elements 28 and non-writing elements 28A with form factors other than that illustrated (e.g., pencils, chalk, etc.) may be employed by fitting adaptors (not shown) to the form factor of the illustrated writing element 28, or by employing alternative embodiments of the stylus 16 designed specifically for those alternate writing elements 28.

In any event, the writing element 28 is disposed toward the tip end 32 of the stylus 16, with the writing tip 30 of the writing element 28 protruding from the housing 26 at the tip end 32. The tip 30 of the writing element 28 may be enclosed by a cover or cap 36 that mates with the housing 26. The cap 36 may be formed to have an inner bore 38 and an outer bore 40, such that the inner bore 38 fits securely around a base 42 of the tip 30, providing a sealed environment 44 in which the tip 30 may be enclosed to prevent the tip 30 from drying out or to protect the tip 30 against damage. The outer bore 40 may provide further isolation of the tip 30 and, additionally, may protect other components of the stylus 16 from damage.

One or more transmitters may be disposed around the base 42 of the tip 30. The transmitters may include transmitters of different types and/or transmitters of the same type and, in one embodiment, include both an infrared transmitter 43 and an ultrasonic transmitter 46. In some embodiments, the infrared transmitter 43 is protected by a window 45 and, in a similar manner, a protection cage 47 may protect the ultrasonic transmitter 46. While FIG. 2 depicts the transmitters 43 and 46 as situated around the base 42 of the tip 30, the transmitters may be located in any suitable location on the stylus 16, though locating the transmitters away from the tip 30 may, in some instances, affect the accuracy of the resulting digitization.

The housing 26 also includes an electronics sub-assembly 48 at a non-writing end 50 of the writing element 28. The electronics sub-assembly 48 houses a rechargeable power source 52, a switch 53, an indicator light source 54, and various other electronics for controlling, among other things, the transmitters 43 and 46. A button 51 may allow the separation of the electronics sub-assembly 48 from the housing 26, to allow access to, or replacement of, the writing element 28.

The stylus 16 is activated by pressing the writing element 28 against the writing surface 14, which activates the switch 53, and causes the rechargeable power source 52 to power the included electronics and the transmitters 43 and 46. As generally known, the rechargeable power source 52 may employ any rechargeable battery technology or capacitive storage solution. In one embodiment, the rechargeable power source 52 is a Lithium-ion battery, though Nickel Zinc batteries, Nickel-Cadmium batteries, rechargeable alkaline batteries, Nickel-Metal Hydride batteries, and Carbon Zinc or Zinc Chloride batteries are all possible alternatives, and other alternatives exist or may be developed in the future.

The rechargeable power source 52 also provides power to the indicator light source 54. A light pipe 56 extending from the indicator light source 54 to the perimeter of the housing 26, and covered by a cover 57, creates an illuminated ring 58 (when the indicator light source 54 is active) at the circuitry end 34 of the stylus 16. In one embodiment, the indicator light source 54 and associated light pipe 56 and illuminated ring 58 indicate that the rechargeable power source 52 is charging when the stylus 16 is properly placed in the charging station 18. Of course, the indicator light source 54 may, by any means known in the art (e.g., by flashing one or more patterns, by using a multi-LED light source, etc.), be used for other or additional indications as well, such as to indicate the stylus 16 is fully charged, or to indicate the stylus 16 has a low battery. Moreover, while the embodiment illustrated in FIG. 2 uses the light pipe 56 to form the illuminated ring 58, other embodiments may place the indicator light source 54 at the perimeter of the housing 26 so that the indicator light source 54 is directly viewable to a user (e.g., through a window in the housing 26). Additionally, the light pipe 58 may illuminate a logo or other symbol (e.g., a battery symbol) on the stylus 16. In some embodiments, an aural indicator (e.g., a buzzer, speaker, etc.) (not shown) may be included instead of, or in addition to, the indicator light source.

Figure 3A:
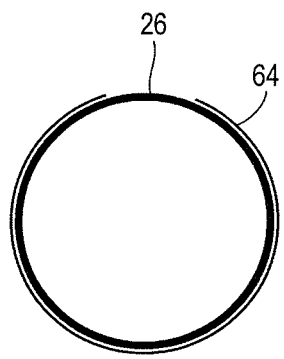
FIG. 3A depicts a cross-sectional view of an alternate embodiment of the charging rings used on the rechargeable stylus of FIG. 2.
Figure 3B:
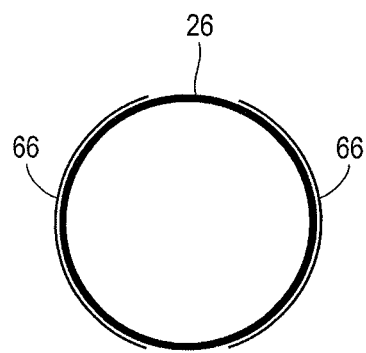
FIG. 3B depicts a cross-sectional view of an alternate embodiment of the charging rings used on the rechargeable stylus of FIG. 2.
Figure 3C:
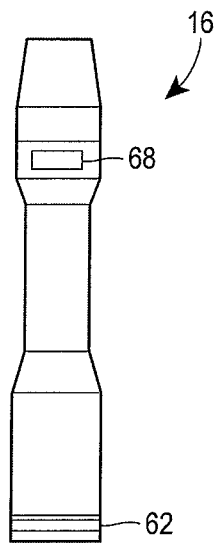
FIG. 3C depicts an alternate embodiment of charging contacts used on the rechargeable stylus of FIG. 2.
Figure 3D:
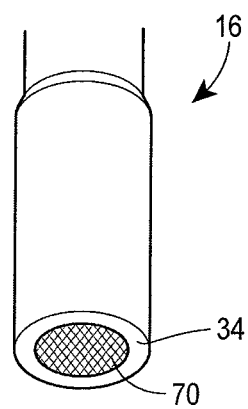
FIG. 3D depicts an alternate embodiment of the charging contacts used on the rechargeable stylus of FIG. 2.

The rechargeable power source 52 is electrically connected to two charging contacts (also referred to herein as charging elements) 60 and 62, one of which is connected to each terminal of the rechargeable power source 52. FIG. 2 depicts an embodiment in which each of the charging contacts 60 and 62 forms a metallic ring encircling the stylus 16. The two charging contacts 60 and 62 are disposed toward opposite ends of the housing 26, with the charging contact 60 disposed toward the tip end 32 of the stylus 16, and the charging contact 62 disposed toward the circuitry end 34 of the stylus 16, adjacent to the indicator ring 58. As will be apparent from the remainder of the description, the use of metallic rings for the charging contacts 60 and 62 allows the contacts 60 and 62 to mate with corresponding charging contacts on the charging station 18, regardless of the axial rotation of the stylus 16 therein. Nevertheless, in other embodiments, the charging contacts may take other forms. For example, in some embodiments, the charging contacts 60 and 62 may be incomplete rings such as the incomplete rings 64 and 66 illustrated in FIGS. 3A and 3B, respectively. In other embodiments, one or both of the charging contacts may be a metallic plate 68 disposed along the length of the housing 26, as depicted in FIG. 3C, or a metallic plate 70 disposed at an end (e.g., the circuitry end 34) of the stylus 16 as depicted in FIG. 3D. In still other embodiments, the charging contacts 60 and 62 may be disposed in other locations along the length of the stylus 16, or may include additional charging contacts (not shown in FIG. 2), as described below in further detail. The charging contacts 60 and 62 are formed of (or plated with) a conductive material, and are preferably formed of (or plated with) a conductive, metallic material that is non-oxidizing, such as Zinc or Nickel, to prevent corrosion.

Figure 4:
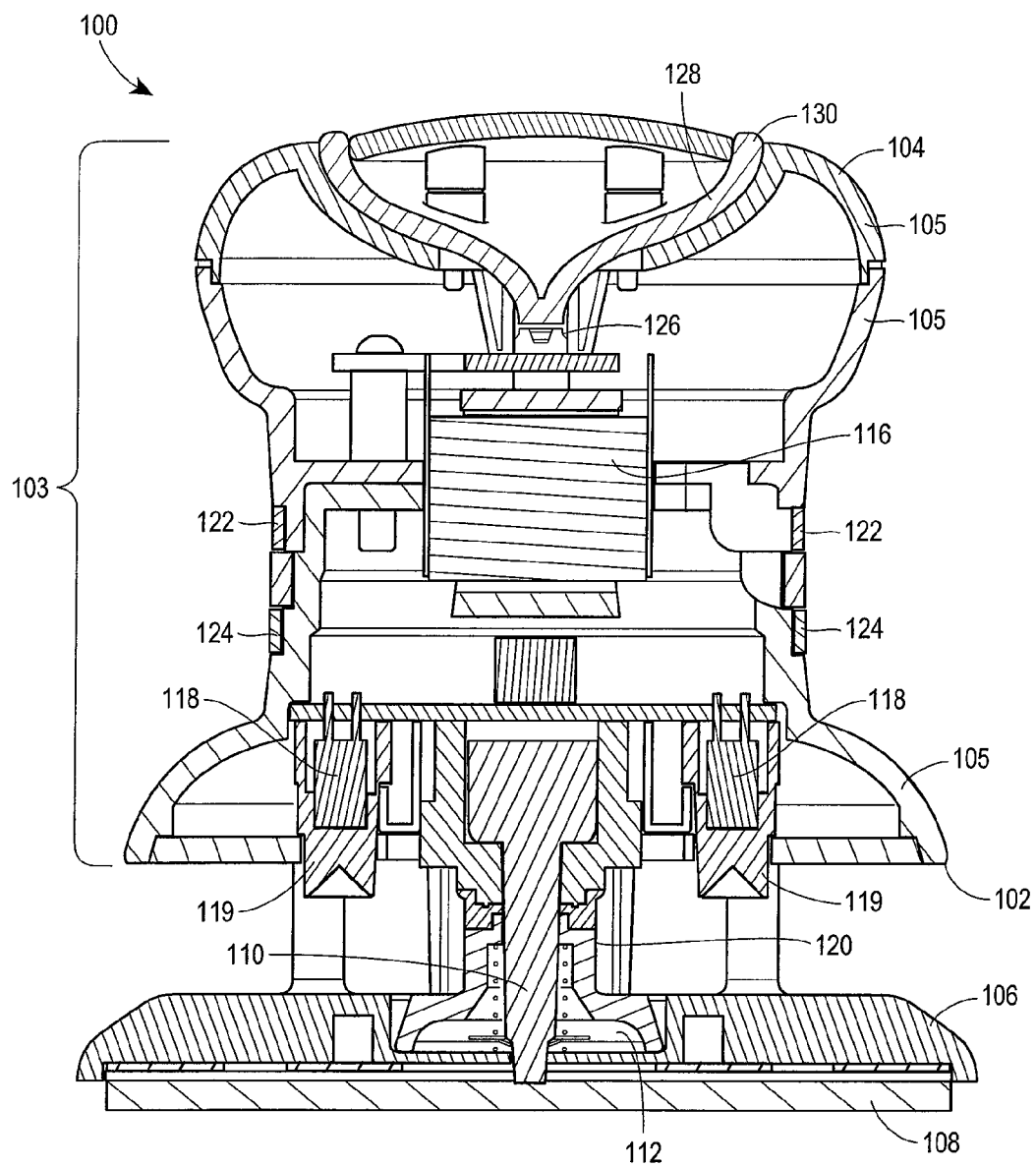
FIG. 4 is a cross-sectional view of a rechargeable eraser for use with an exemplary rechargeable stylus system.

FIG. 4 illustrates a cross-sectional view of a rechargeable erasing device 100 that can also be used with the system 10 illustrated in FIG. 1A. The rechargeable erasing device 100 has an erasing pad 108 affixed to an erasing platform 106, and a housing 105 forming an eraser body 103 and having an eraser end 102 and a grip end 104. FIG. 4 depicts an eraser pad 108 complementary to the stylus 16 depicted in FIG. 2. That is, the eraser pad 108 is a soft, synthetic felt material suitable for removing dry erase ink from a dry erase board. However, the eraser pad 108 may be any material suitable or desired for erasing the markings left by the stylus 16. In some embodiments, the eraser pad 108 is replaceable, to allow replacement of worn eraser pads 108 and/or allowing replacement of an eraser pad 108 of one material with an eraser pad 108 of a different material. In other embodiments, the eraser pad 108 and the eraser platform 106 form a replaceable cartridge. For example, in either embodiment a first cartridge or pad may include a soft, synthetic felt for use in erasing dry erase ink from a dry erase board, while a second cartridge or pad may include a harder felt for use erasing chalk from a chalk board, and a third cartridge or pad may include a Teflon pad for "erasing" part of a projected display (e.g., when the eraser 100 is acting as an input device to a computer projecting a display through a projector onto the writing surface 14, which writing surface 14 may be a projector screen).

In any event, the eraser platform 106 is affixed to a force transmission member 110. The force transmission member 110 may be formed of any suitable material (e.g., wood, plastic, metal, etc.), and may be solid or hollow. The force transmission member 110 may cooperate with a retention mechanism 112 that connects the eraser body 103 to the eraser platform 106. Alternatively, the force transmission member 110 may be formed with a retention mechanism (not shown) for affixing the eraser platform 106 (or the cartridge) to the eraser body 103.

When the eraser 100 is pressed against the writing surface 14, the force transmission member 110 transmits the pressure from the eraser pad 108 to the eraser body 103 and, in particular, to a switch 114 located within the housing 105 of the eraser body 103. As described above with respect to the stylus 16, activation of the switch 114 causes a rechargeable power source 116 to power various electronics and transmitters and, in particular, one or more infrared transmitters 118 (which may be protected by one or more lenses or windows 119) and one or more ultrasonic transmitters 120. Also like the rechargeable stylus 16, the transmitters 118 and 120 of the rechargeable erasing device 100 transmit an infrared signal and an ultrasonic signal, respectively, upon placement of the eraser pad 108 against the writing surface 14. The infrared signal identifies the eraser device 100 to the TCU 12, and indicates to the TCU 12 that the eraser device 100 has transmitted an ultrasonic signal. The TCU 12, given the diameter of the eraser pad 108 on the eraser device 100, calculates the position of the eraser device 100 and uses the information to determine what portion of the writing surface 14 and, therefore, what portion of the digitized text or drawing, the user has erased.

Referring still to FIG. 4, the illustrated embodiment of the rechargeable eraser 100 includes four infrared transmitters 118 and a single ultrasonic transmitter 120. It should be apparent that the line-of-sight nature of infrared communications requires that regardless of the orientation of the eraser 100 when placed against the writing surface 14, the infrared signal generated by the one or more infrared transmitters 118 must be directed toward the TCU 12. Thus, depending, among other things, on the shape of the eraser 100, the position of the infrared transmitters 118, the position of the eraser 100, and the sensitivity of the infrared receiver 24 on the TCU 12, an embodiment of the eraser 100 may require (or at least benefit from) multiple infrared transmitters 118, as depicted in FIG. 4. Where the eraser 100 includes multiple infrared transmitters 118 the infrared transmitters 118 are preferably disposed in a symmetric pattern around the perimeter of the eraser 100. For example, the eraser 100 depicted in FIG. 4 illustrates the eraser 100 with a generally cylindrical body and four infrared transmitters 118 disposed at 90 degree increments around the axial center of the eraser 100.

Similarly, one or more of the ultrasonic transmitters 120 may be employed on the eraser 100. FIG. 4 depicts an embodiment of the eraser 100 having a single ultrasonic transmitter 120 disposed concentrically around the force transmission member 110 such that the ultrasonic signal transmitted from the ultrasonic transmitter 120 propagates radially outward from the axial center of the eraser 100. This arrangement allows the ultrasonic receivers 20 and 22 on the TCU 12 to receive the ultrasonic signal regardless of the orientation of the eraser 100 when placed against the writing surface 14. While some embodiments of the stylus include only a single ultrasonic transmitter 120, other embodiments may use multiple ultrasonic transmitters 120. For example, one embodiment employs two ultrasonic transmitters 120 operating at different ultrasonic frequencies. This arrangement, when paired with a TCU 12 having ultrasonic sensors 20 and 22 capable of separately sensing each frequency, or when paired with a TCU 12 having two ultrasonic sensors 20 and two ultrasonic sensors 22, may provide additional accuracy as to the position and/or the orientation of the eraser 100.

The eraser 100 further includes two charging contacts 122 and 124, both of which are disposed on the housing 105 of the body 103, and one of which is connected to each terminal of the rechargeable power source 116. Each of the charging contacts 122 and 124 is formed of (or plated with) a conductive material and, preferably, a non-oxidizing, conductive material such as Zinc or Nickel. In the embodiment depicted in FIG. 4, each of the charging contacts 122 and 124 forms a ring around the circumference of the eraser body 103, to facilitate contact between the charging contacts 122 and 124 and the corresponding charging contacts on the charging station 18, regardless of the axial rotation of the eraser 100 therein. Of course, the charging contacts 122 and 124 need not form a ring around the circumference of the eraser body 103. Instead, the charging contacts 122 and 124 may take any form compatible with the corresponding contacts on the charging station 18, or may be located elsewhere on the rechargeable eraser 100.

For example, in one embodiment, one of the charging rings 122 and 124 may be disposed on the body 103 of the eraser 100, while the other of the charging rings 122 and 124 may be disposed on the eraser platform 106 (so long as there is an electrical connection between the charging ring on the eraser platform 106 and the rechargeable power source 116).

In much the same way that the indicator light source 58 and the light pipe 56 cooperate to form an indicator ring 58 on the stylus 16, the eraser 100 includes an indicator light source 126 that cooperates with a light pipe 128 to form an illuminated ring 130. In one embodiment, the indicator light source 126 and associated light pipe 128 and illuminated ring 130 are used to indicate that the rechargeable power source 116 is charging when the eraser 100 is properly placed in the charging station 18. Of course, the indicator light source 126 may, by any means known in the art (e.g., by flashing one or more patterns, by using a multi-LED light source, etc.), be used for other or additional indications as well, such as to indicate the eraser 100 is fully charged, or to indicate that the eraser 100 has a low battery. Moreover, while the embodiment illustrated in FIG. 4 uses the light pipe 128 to form the illuminated ring 130, other embodiments may place the indicator light source 126 at the perimeter of the housing 105 so that the indicator light source 126 is directly viewable to a user (e.g., through a window in the housing 126). Additionally, the light pipe 126 may illuminate a logo or other symbol (e.g., a battery symbol) on the eraser 100. In some embodiments, an aural indicator (e.g., a buzzer, speaker, etc.) (not shown) may be included instead of, or in addition to, the indicator light source.

Figure 5:
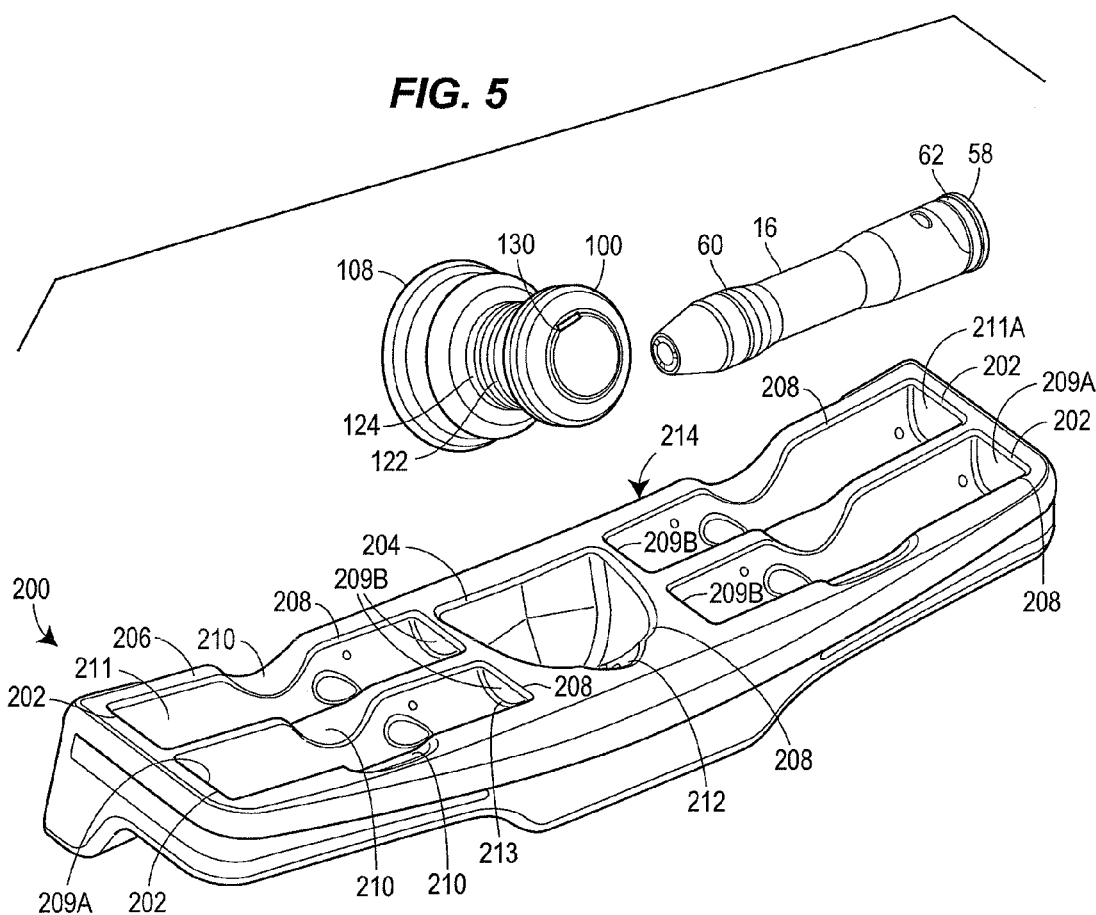
FIG. 5 is a perspective view of a rechargeable stylus, a rechargeable eraser, and a charging tray for recharging the stylus and eraser.

As described, each of the rechargeable stylus 16 and the rechargeable eraser 100 cooperate with the charging station 18 to recharge the respective power sources 52 and 116. FIG. 5 illustrates an embodiment 200 of the charging station 18. In the depicted embodiment, one or more of the styli 16, and the eraser 100, may cooperate with the charging station 200 to charge the respective power sources 52 and 116 of the one or more styli 16 and the eraser 100, as described in further detail below. The charging station 200 includes one or more stylus receptacles 202 for recharging the rechargeable styli 16. While FIG. 5 depicts an embodiment with four stylus receptacles 202, the charging station 200 may include a single stylus receptacle 202 or may otherwise include more or less than four stylus receptacles 202. Additionally, the charging station 200 may or may not include an eraser receptacle 204 for recharging the rechargeable eraser 100. The charging station 200 preferably has a generally rectangular top face 206, and the various receptacles 202 and 204 are preferably disposed within the top face 206 such that a top edge 208 of each receptacle 202, 204 is coplanar with the top face 206. The top face 206 and styli receptacles 202 may cooperate to form a plurality of depressions 210, which may facilitate grasping and removal of the styli 16 from the receptacles 202. In a similar manner, a depression 212 may facilitate grasping and removal of the eraser 100 from the receptacle 204. A back face 214 intersects the top face 206, and extends downward from the top face 206. The back face 214 is preferably planar, allowing the back face 214 to mount flush against another planar surface such as the writing surface 14, as depicted in FIG. 1A.

Figure 6A:
FIG. 6A depicts an embodiment of a receptacle included in the charging tray of FIG. 5.
Figure 6B:
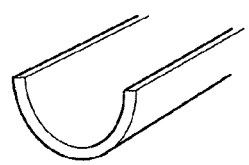
FIG. 6B depicts a perspective view of an embodiment of a receptacle included in the charging tray of FIG. 5 and having a curvilinear cross-section.
Figure 6C:
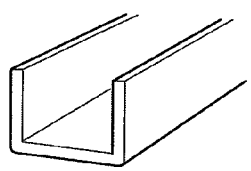
FIG. 6C depicts a perspective view of an embodiment of a receptacle included in the charging tray of FIG. 5 and having a rectangular cross-section.

Each of the stylus receptacles 202 is preferably formed such that the shape of the receptacle 202 is generally complementary to the shape of the stylus 16. For example, the receptacles 202 illustrated in FIG. 5 have a shape generally complementary to the stylus 16. That is, each receptacle 202 is a horizontally-extending elongated groove or channel 211 with a generally curvilinear cross section 213 complementary to the generally cylindrical shape of the illustrated stylus 16. FIG. 5 depicts an embodiment in which the channels 211 of each of the stylus receptacles 202 are at an incline 215 such that an end 209A of each receptacle 202 is at a greater depth below the plane of the top surface 206 than an end 209B of each receptacle 202. This is further depicted in FIG. 6A. The incline 215 may, in addition to the depressions 210, aid in grasping and removing the stylus 16 from the receptacle 202. Of course, it will be apparent that, while in some embodiments the channel 211 has a curvilinear cross-section 213 and is at an incline 215 with regard to the plane of the top surface 206, as depicted in FIG. 6B, the channel 211 could also have a rectangular cross-section, as depicted in FIG. 6C, or any other desirable cross-section. Moreover, the channel 211 may have more or less of an incline 215 and, in fact, need not have an incline 215 at all.

While the shape of the channels 211 of each of the stylus receptacles 202 is described as complementary to the shape of the stylus 16, it is worth noting that there is no feature of the receptacles 202 that acts against removal of the stylus 16 from the channel 211. Thus, if the charging station 200 were turned upside-down (or even so that the top face 206 were perpendicular to the ground, each stylus 16 would simply fall out of its respective receptacle 202. The lack of any retention mechanism within the receptacle 202 (or the receptacle 204) promotes usage thereof, because this permits a user to place or remove the stylus 16 (or the eraser 100) in the receptacle 202 (or 204) without requiring any additional force, and permits the user to use the charging station 200 just as the user would use a marker tray on a dry erase board, or a chalk tray on a chalk board.

Figure 7:
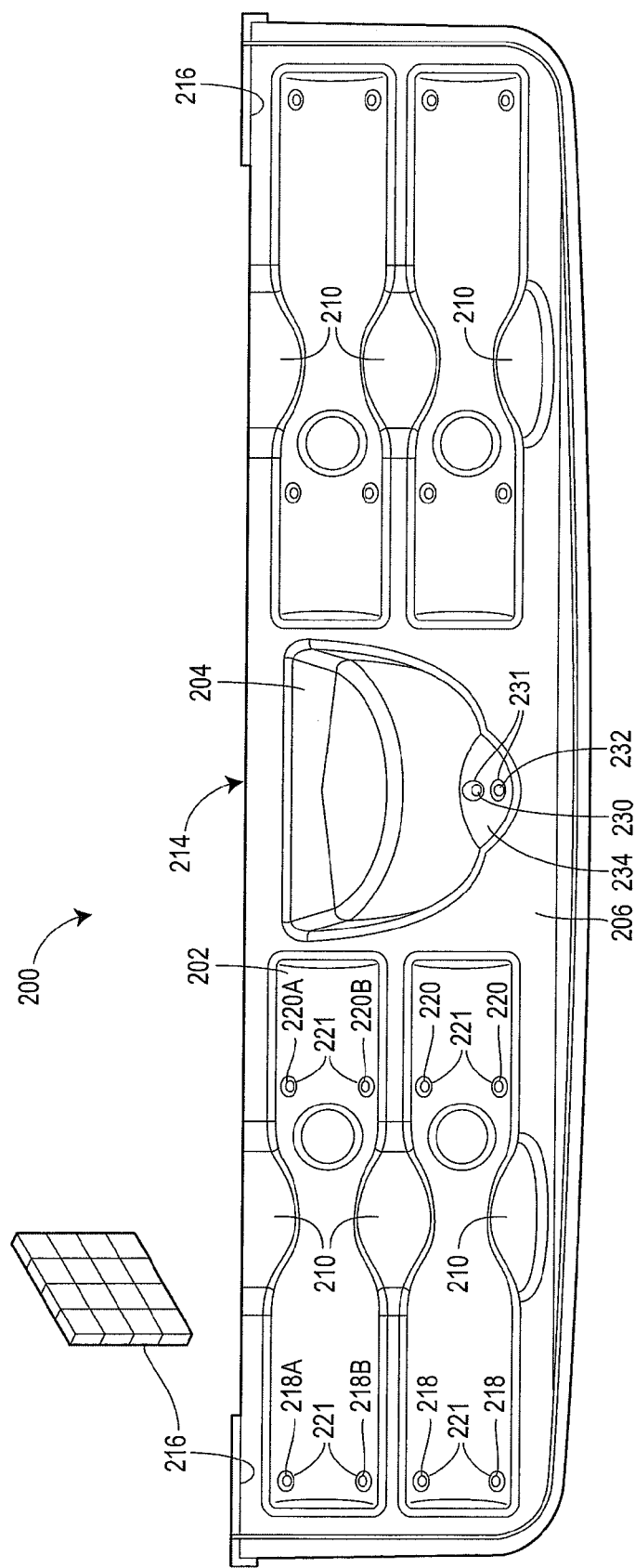
FIG. 7 depicts a top plan of the recharging tray of FIG. 5.

FIG. 7 depicts a top plan view of the charging station 200 in FIG. 5. As FIG. 7 illustrates, the back face 214 includes two arrays 216 of magnets for adhering the back face 214 of the charging station 200 to a metallic surface such as the writing surface 14. Of course, other methods of adhering the charging station 200 to a surface could also be employed, such as suction cups, clamps, adhesive tape, glue, hook-and-loop material, etc., depending on the surface to which the charging station 200 is to be adhered.

The top plan view FIG. 7 also illustrates each of the styli receptacles 202 having two sets of charging contacts 218 and 220. In the depicted embodiment, the charging contacts 218 include two contacts 218A and 218B, while the charging contacts 220 include two contacts 220A and 220B. Each pair of contacts 218, 220 is disposed within the receptacle 202 and arranged to contact the corresponding charging rings 60 and 62 disposed on the stylus 16. As depicted in FIG. 7, in one embodiment each set of charging contacts 218 and 220 protrudes through a pair of openings 221 in the surface 222 of the receptacle 202. Each of the contacts 218A and 218B and each of the contacts 220A and 220B may be electrically and physically connected to each other as depicted in FIGS. 8A and 8B. In one embodiment, depicted in FIG. 8A, each of the contacts 218A and 218B, and each of the contacts 220A and 220B, is formed on an arc-shaped metallic band 224. In this manner, the arc shape of the metallic band 224 is complementary to the underside of the channel 211, allowing the contacts 218 and 220 to protrude through the openings 221 in the surface 222 of the channel 211 forming the receptacle 202. In another embodiment, depicted in FIG. 8B, each of the contacts 218A and 218B, and each of the contacts 220A and 220B, is formed on (or as part of) a metallic plate 226 approximately twice the width of the contact. The pair of metallic plates 226 for the set 218 or the set 220 of contacts are electrically connected to each other by a metallic strip 228 stamped (or otherwise formed) into a "V" shape such that the contacts 218 and the contacts 220 protrude through the openings 221 in the surface 222 of the channel 211 forming the receptacle 202. As also depicted in FIGS. 8A and 8B, the openings 221 in the surface 222 may be surrounded on the underside of the channel 211 by a recessed area 223, to facilitate fitting engagement of the metallic band 224 or the metallic plate 226 with the underside of the channel 211 and prevent lateral or radial movement of the contacts 218 and 220.

Each configuration of contacts depicted in FIGS. 8A and 8B may provide an additional advantage to the disclosed charging system 10. The metallic band 224 and the metallic strip 228 may each be formed such that they provide a spring force against the channel 211 when assembled so that the contacts 218 or 220 protrude through the openings 221 in the surface 222 of the channel 211. This arrangement provides a distinct advantage in that the metallic band 224 and/or the metallic strip 228 may be formed so the spring force is slightly less than the force of the stylus 16 against the contacts 218 and 220 when acted on by gravity. By so configuring the band 224 and/or the strip 228, the contacts 218 and 220 can be configured to retreat slightly through the opening 221 as they come into contact with the charging contacts 60 and 62 on the stylus 16, allowing the stylus to lower slightly into receptacle 202 while still maintaining contact between the charging contacts 60 and 62. Thus, as the stylus 16 is lowered into the receptacle 202, the charging contacts 218 and 220 move slightly along the charging contacts 60 and 62. This "swiping" movement may facilitate better conductivity between the contacts 218 and 220 and the respective charging contacts 62 and 60 by clearing debris or other fouling of the contacts or rings that may otherwise interfere between the two.

Referring again to FIG. 7, the top plan view also illustrates the eraser receptacle 204 having a set of charging contacts 230 and 232. The charging contacts 230 and 232 are disposed within the receptacle 204 and arranged to contact the corresponding charging contacts 122 and 124 on the rechargeable eraser 100. Similar to the charging contacts 218 and 220 in the stylus receptacles 202, in one embodiment the charging contacts 230 and 232 protrude through a pair of openings 231 in the surface 234 of the receptacle 204. While the embodiment depicted in FIG. 7 includes only a single contact 230 or 232 for each of the corresponding charging rings 122 and 124 on the rechargeable eraser 100, alternate embodiments may employ arrangements of two or more contacts 230 or 232, similar to the arrangement of two contacts 218 or two contacts 220 employed in the embodiment of the receptacles 202 depicted in FIG. 7.

Figure 9A:
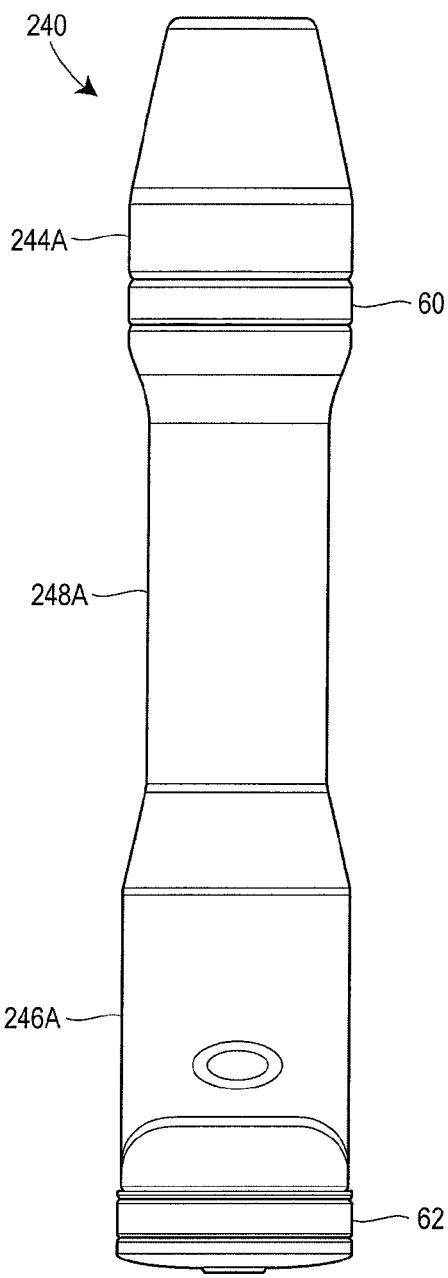
FIG. 9A illustrates an embodiment of a rechargeable stylus for use in the system of FIG. 1.
Figure 9B:
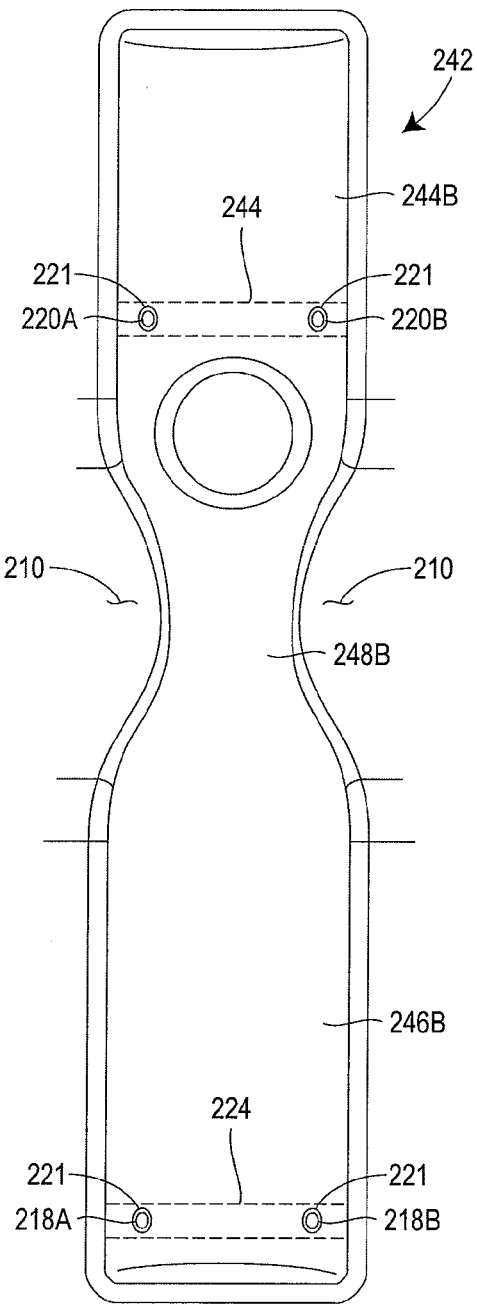
FIG. 9B illustrates an embodiment of a charging tray receptacle for use with the rechargeable stylus of FIG. 9A.

Referring now to FIGS. 9A and 9B, an illustrated embodiment includes a stylus 240 and a receptacle 242 having generally corresponding form factors. For example, FIG. 9A depicts the stylus 240 including a first portion 244A, a second portion 246A, and mid-portion 248A. Each of the first and second portions 244A and 246A, respectively, is depicted as being wider, in general, than the mid-portion 248A. FIG. 9B similarly depicts the receptacle 242 including a first portion 244B generally corresponding in size and shape to the portion 244A of the stylus 240, a second portion 246B generally corresponding in size and shape to the portion 246B of the stylus 240, and a mid-portion 248B generally corresponding in size and shape to the portion 248A of the stylus 240. The charging contacts 60 and 62 on the stylus 240 are configured to align with the corresponding charging contacts 220 and 218, respectively, on the receptacle 242 when the stylus 240 is rested in the receptacle 242. Moreover, the lack of a retention mechanism facilitates effortless placement of the stylus 240 in, and removal of the stylus 240 from, the receptacle 242. The depressions 210 in the mid-portion 248B of the receptacle 242, aid in grasping the stylus 240 to remove it from the receptacle 242. It should be apparent both from the respective shapes of the stylus 240 and the receptacle 242, and from the respective placements of the charging contacts 60 and 62 and the charging contacts 218 and 220, that the stylus 240 and the receptacle 242 must be oriented as depicted by FIGS. 9A and 9B if the stylus 240 and the receptacle 242 are to cooperate to charge the rechargeable power source 52.

FIGS. 10A, 10B, and 10C illustrate an alternate embodiment of the system 10, in which a receptacle 250 (FIG. 10B) may cooperate with a stylus 252 (FIGS. 10A and 10C) to charge the stylus 252 regardless of the orientation of the stylus 252 when resting in the receptacle 250. In this alternate embodiment, the receptacle 250 includes three sets of charging contacts 254. A first set of charging contacts 254A is disposed at the midpoint of the length of the receptacle 250, while second and third sets of charging contacts 254B and 254C, respectively, are each disposed at a distance, D2, along the length of the receptacle 250 from the first set of charging contacts 254A. The charging contacts 254 are electrically connected to a power source (not shown) such that the charging contacts 254A are connected to one of "power" or "ground," while the charging contacts 254B and 254C are connected to the other of "power" or "ground."

The stylus 252 includes two charging contacts 256A and 256B. The charging contact 256A corresponds electrically (i.e., is the same one of "power" or "ground") to the charging contacts 254A, and is disposed at the midpoint of the length of the stylus 252 so that it aligns with the charging contacts 254A when placed in the receptacle 250. The charging contact 256B corresponds electrically to the charging contacts 254B and 254C, and is disposed at the same distance, D2, from the charging contact 256A so that it aligns with either the set of contacts 254C (as depicted in FIG. 10A) or the set of contacts 254B (as depicted in FIG. 10C). In this manner, the stylus 252 may be placed in the receptacle 250 in either of the orientations shown in FIGS. 10A and 10C, while still cooperating with the charging station 200 to charge the rechargeable power source 52.

FIGS. 11A, 11B, and 11C illustrate yet another embodiment of the system 10, in which a receptacle 260 (FIG. 11B) may cooperate with a stylus 262 (FIGS. 11A and 11C) to charge the stylus 262 regardless of the orientation of the stylus 262 when resting in the receptacle 260. In this embodiment, each receptacle includes two sets of charging contacts 264. A first set of charging contacts 264A is disposed at a distance, D3, from a first end 266 of the receptacle 260, while a second set of charging contacts 264B is disposed at the same distance, D3, from a second end 268 of the receptacle 260. A charging circuit (not shown) electrically connects the charging contacts 264 to a power source (not shown) such that each set of charging contacts 264 may be connected either to "power" or to "ground," according to the orientation of the stylus 262 in the receptacle 260. A simple diode bridge is one charging circuit, known to those of ordinary skill in the art, that would accomplish this reversible polarity feature.

The stylus 262 includes two charging contacts 270A and 270B. Each of the charging contacts 270A and 270B may correspond electrically to either "power" or "ground" (so long as one contact 270 is connected to each), and is disposed at the distance, D3, a respective end 272 or 274 of the stylus 262. The charging circuit acts to align the two sets of charging contacts 264A and 264B on the receptacle 260 with the charging contacts 270A and 270B on the stylus 260. For example, suppose that the charging contact 270A is connected to the "power" terminal of the rechargeable power source 52, and that the charging contact 270B is connected to the "ground" terminal of the rechargeable power source 52. The charging circuit would act to align the relative polarities of the sets of charging contacts 264A and 264B such that, when the stylus 262 is placed in the receptacle 260 as depicted in FIGS. 11A and 11B, respectively, the set of charging contacts 264A connects to "power" while the set of charging contacts 264B connects to "ground." Likewise, when the stylus 262 is placed in the receptacle 260 as depicted in FIGS. 11C and 11B, respectively, the charging circuit would act to align the relative polarities of the sets of charging contacts 264A and 264B such that the set of charging contacts 264A connects to "ground" while the set of charging contacts 264B connects to "power." In this manner, the stylus 262 may be placed in the receptacle 260 in either of the orientations shown in FIGS. 11A and 11C, while still cooperating with the charging station 200 to charge the rechargeable power source 52.

It should be understood that in the embodiment described with reference to FIGS. 10A, 10B, and 10C, it need not be the receptacle 250 that has three sets of charging contacts 254. Instead, the stylus 252 could have three charging contacts 256, while the receptacle 250 includes only two sets of charging contacts 254. Likewise, it should also be understood that in the embodiment described with reference to FIGS. 11A, 11B, and 11C, the charging circuit may electrically connect the charging contacts 270 on the stylus 262 to the rechargeable power source 52, while each of the two sets of charging contacts 264 on the receptacle 260 is connected to either "power" or "ground" (so long as one set of charging contacts 264 is connected to each).

Figure 12:
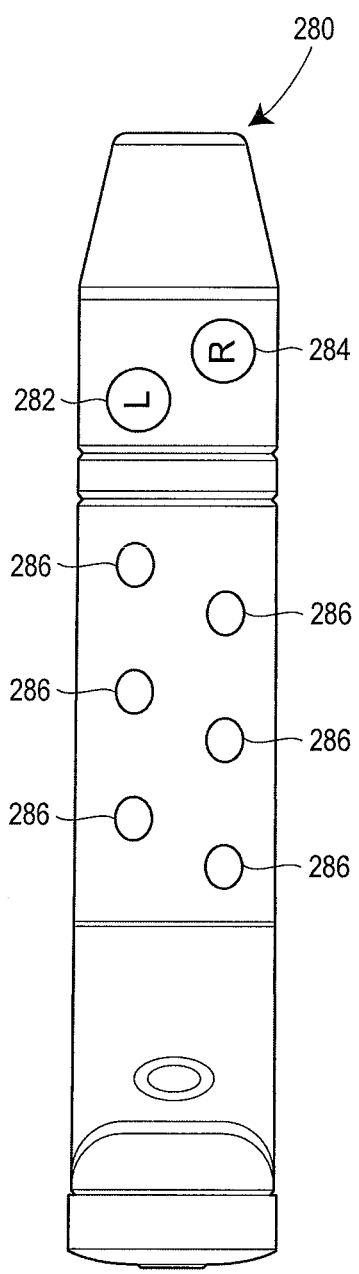
FIG. 12 illustrates a rechargeable stylus having mouse functionality.

As described above, the stylus 16 may also be a mouse operating in almost all regards similar to the styli 16 described with reference to FIG. 2, but having a non-marking writing element 28, and having some additional functionality. FIG. 12 depicts one embodiment of a mouse stylus 280 that, in addition to a non-marking writing element 28, also includes buttons 282 and 284, which may function as left and right mouse buttons, respectively. The mouse stylus 280 may also include one or more buttons 286 for activating features of associated software, performing macro operations, etc. Of course, the activation of any of the buttons 282, 284, or 286 may be communicated to a connected computer system (not shown) through the TCU 12 using the infrared signal to indicate to the TCU 12 that a user pressed the button 282, 284, or 286, or may be communicated directly to the connected computer system by another wireless means (e.g., wireless USB, Bluetooth®, etc.).

While the present disclosure describes specific embodiments intended to be illustrative only, and not limiting, it will be apparent to those of ordinary skill in the art that changes, additions, or deletions may be made to the disclosed embodiments without departing from the spirit and scope of the disclosure. Moreover, it is explicitly contemplated that each of the individual features described with reference to the various embodiments disclosed may be combined with any of the other features disclosed herein. Thus, the intention is to cover all modifications, alternative constructions, and equivalents falling within the spirit and scope of the disclosure as defined by the appended claims.

What is claimed is:

1. A rechargeable eraser for erasing electronic or non-electronic writing on a writing surface, the eraser comprising:
   a transmitter;
   an erasing surface for erasing the writing from the writing surface;
   a rechargeable power source;
   a first external charging contact electrically coupled to a first terminal of the rechargeable power source; and
   a second external charging contact electrically coupled to a second terminal of the rechargeable power source;
   wherein each of the first and second charging contacts comprises an external electrically conductive ring; and
   wherein the eraser is adapted to cooperate with a charging station to charge the rechargeable power source.

2. The rechargeable eraser of claim 1, wherein each of the conductive rings extends only partially around the circumference of the eraser.

3. The system of claim 1, wherein the eraser further comprises an eraser body having a generally circular cross section about an axis of the eraser body perpendicular to the erasing surface.

4. A system comprising:
   an eraser for erasing electronic or non-electronic writing on a writing surface, the eraser comprising:
      a first rechargeable power source;
      an erasing surface for erasing the writing from the writing surface;
      a first eraser charging element electrically coupled to a first terminal of the first rechargeable power source; and
      a second eraser charging element electrically coupled to a second terminal of the first rechargeable power source; and
   a charging tray comprising:
      a first receptacle for receiving the eraser;
      a first eraser charging contact associated with the first receptacle and positioned to align with the first eraser charging element on the eraser when the eraser is resting in the first receptacle;
      a second eraser charging contact associated with the first receptacle and positioned to align with the second eraser charging element on the eraser when the eraser is resting in the first receptacle; and
      a charging power source electrically coupled to at least one of the first and second eraser charging contacts;
   wherein each of the eraser charging elements on the eraser forms an external ring on the eraser; and
   wherein, when the eraser is resting in the first receptacle, the first eraser charging element of the eraser is electrically coupled to the first eraser charging contact of the first receptacle and the second eraser charging element of the eraser is electrically coupled to the second eraser charging contact of the first receptacle.

5. The system of claim 4, wherein the eraser further comprises an eraser body having a generally circular cross section about an axis of the eraser body perpendicular to the erasing surface.

6. The system of claim 4, wherein each of the eraser charging elements extends only partially around the circumference of the eraser.

7. The system of claim 4, wherein each of the first and second eraser charging contacts comprises two or more contact points for electrically coupling the eraser charging contact to one of the first and second eraser charging elements.

8. The system of any of claim 4, wherein each of the first and second eraser charging contacts is resiliently mounted for allowing the first and second eraser charging contacts to move over a surface of the respective eraser charging element when the first receptacle receives the eraser.

9. The system of claim 4, wherein the charging tray further comprises a plurality of magnets arranged in a grid pattern along a mounting surface of the charging station.

10. The system of claim 4, wherein the charging station further comprises a second receptacle for receiving a stylus device.

11. The system of claim 10, wherein:
   the stylus device comprises:
      a second rechargeable power source;
      a first stylus charging element electrically coupled to a first terminal of the second rechargeable power source; and
      a second stylus charging element electrically coupled to a second terminal of the second rechargeable power source; and
   the second receptacle further comprises:
      a first stylus charging contact associated with the second receptacle and positioned to align with the first stylus charging element on the stylus when the stylus is resting in the second receptacle; and
      a second stylus charging contact associated with the second receptacle and positioned to align with the second stylus charging element on the stylus when the stylus is resting in the second receptacle;
   wherein, when the stylus is resting in the second receptacle, the first stylus charging element of the stylus is electrically coupled to the first stylus charging contact of the receptacle and the second stylus charging element of the stylus is electrically coupled to the second stylus charging contact of the receptacle.

12. The system of claim 11, wherein each of the first and second stylus charging elements comprises an electrically conductive ring.

13. The system of claim 10, wherein the stylus device comprises a sleeve having a generally cylindrical hollow space.

14. A charging station for a rechargeable eraser, the charging station comprising:
   a first receptacle for receiving the rechargeable eraser;
   a first charging contact associated with the first receptacle;
   a second charging contact associated with the first receptacle; and
   a charging power source electrically coupled to at least one of the first and second charging contacts;
   wherein each of the first and second charging contacts arranged to electrically couple the charging station to corresponding contacts on the rechargeable eraser when the rechargeable eraser is resting in the first receptacle, wherein each of the corresponding contacts on the rechargeable eraser comprises an external, electrically conductive ring and wherein no insertion force is required to couple the first and second charging contacts to the corresponding contacts on the rechargeable eraser.

15. The charging station of claim 14, further comprising a plurality of magnets arranged in a grid pattern along a mounting surface of the charging station.

16. The charging station of claim 14, further comprising a second receptacle for receiving a stylus device.

17. The charging station of claim 16, further comprising:
   a first stylus charging contact associated with the second receptacle and positioned to align with a first stylus charging element on the stylus device when the stylus device is resting in the second receptacle; and a second stylus charging contact associated with the second receptacle and positioned to align with a second stylus charging element on the stylus device when the stylus device is resting in the second receptacle;

wherein, when the stylus device is resting in the second receptacle, the first stylus charging element of the stylus device is electrically coupled to the first stylus charging contact of the second receptacle and the second stylus charging element of the stylus device is electrically coupled to the second stylus charging contact of the second receptacle.

18. The charging station of claim 17, wherein each of the first and second stylus charging elements comprises an electrically conductive ring.

19. The charging station of claim 14, wherein the first receptacle is adapted to receive an eraser comprising an eraser body having a generally circular cross-section about an axis of the eraser body perpendicular to the erasing surface.

20. The charging station of claim 16, wherein the second receptacle comprises a channel, the channel open along the length of the channel and into which channel a stylus may be placed such that the length of the channel receives the stylus.

\* \* \* \* \*

UNITED STATES PATENT AND TRADEMARK OFFICE
CERTIFICATE OF CORRECTION

PATENT NO. : 8,450,972 B2
APPLICATION NO. : 12/648845
DATED : May 28, 2013
INVENTOR(S) : Cacioppo et al.

It is certified that error appears in the above-identified patent and that said Letters Patent is hereby corrected as shown below:

In the Claims

In Column 13, Line 19, in Claim 3, delete "system" and insert -- rechargeable eraser --, therefor.

In Column 13, Line 66, in Claim 8, delete "of any of claim" and insert -- of claim --, therefor.

Signed and Sealed this
Twenty-first Day of April, 2015

Michelle K. Lee
*Director of the United States Patent and Trademark Office*